United States Patent
He et al.

(10) Patent No.: US 12,191,807 B2
(45) Date of Patent: Jan. 7, 2025

(54) NON-DESTRUCTIVE TESTING SYSTEM AND DEVICE FOR PHOTOVOLTAIC CELLS

(71) Applicant: Hunan University, Changsha (CN)

(72) Inventors: Yunze He, Changsha (CN); Ruizhen Yang, Changsha (CN); Hongjin Wang, Changsha (CN); Zihao Sui, Changsha (CN); Pan Wang, Changsha (CN); Xiaofei Zhang, Changsha (CN)

(73) Assignee: Hunan University, Changsha (CN)

( * ) Notice: Subject to any disclaimer, the term of this patent is extended or adjusted under 35 U.S.C. 154(b) by 123 days.

(21) Appl. No.: 18/179,031

(22) Filed: Mar. 6, 2023

(65) Prior Publication Data
US 2023/0208355 A1 Jun. 29, 2023

(30) Foreign Application Priority Data
Mar. 18, 2022 (CN) .......................... 202210270220.0

(51) Int. Cl.
*H02S 50/15* (2014.01)
*G01J 5/00* (2022.01)
*G01J 5/48* (2022.01)

(52) U.S. Cl.
CPC .............. *H02S 50/15* (2014.12); *G01J 5/485* (2022.01); *G01J 2005/0077* (2013.01)

(58) Field of Classification Search
None
See application file for complete search history.

(56) References Cited

FOREIGN PATENT DOCUMENTS

| CN | 107192759 A | | 9/2017 |
|---|---|---|---|
| CN | 107192759 B | * | 9/2017 |

* cited by examiner

Primary Examiner — Christopher Braniff

(57) ABSTRACT

A non-destructive testing system for photovoltaic cells includes a non-contact electromagnetic induction device, a short-wave infrared (SWIR) camera or/and a visible-light camera, a thermal imaging device, and an image processing device. The non-contact electromagnetic induction device is configured for generating an external electric field acting on the photovoltaic cell without being in contact with the photovoltaic cell. A direction of the external electric field is parallel to that of an internal electric field of the photovoltaic cell. The SWIR camera or/and the visible-light camera is/are configured for obtaining an optical radiation distribution map within the photovoltaic cell. The thermal imaging device is configured for obtaining a thermal radiation distribution map in the photovoltaic cell. The image processing device is configured for storing and processing the optical and thermal radiation distribution maps. Non-destructive testing equipment including the above system is further provided.

5 Claims, 2 Drawing Sheets

NON-DESTRUCTIVE TESTING SYSTEM AND DEVICE FOR PHOTOVOLTAIC CELLS

CROSS-REFERENCE TO RELATED APPLICATIONS

This application claims the benefit of priority from Chinese Patent Application No. 202210270220.0, filed on Mar. 18, 2022. The content of the aforementioned application, including any intervening amendments thereto, is incorporated herein by reference in its entirety.

TECHNICAL FIELD

This application relates to non-destructive testing, and more particularly to a non-destructive testing system and device for photovoltaic cells.

BACKGROUND

Photovoltaic (PV) power generation has played a vital role in China's energy transformation. Recently, the shutdown, production cut and safety accidents caused by quality defects of the photovoltaic cells have become more and more frequent.

There are dozens of detection technologies available to evaluate the quality of photovoltaic cells, among which the electrical parameter measurement has rapid detection, but cannot exactly detect the location of defects; the electroluminescence (EL) method can quickly detect defects, and is sensitive to surface defects; and the electro-thermography (ET) technique is sensitive to thermal phenomena caused by faults of photovoltaic cells such as leakage current, and can detect the internal breakdown defects.

However, in the EL and ET techniques, electrodes of the power supply need to be in contact with the photovoltaic cell, which not only affects the detection speed, but also may cause scratch on the photovoltaic cell. In addition, the EL and ET techniques are performed under static conditions (namely, the imaging equipment and photovoltaic cells are kept static), failing to realize dynamic and efficient imaging. Moreover, for the ET technique, it is difficult to achieve quantitative evaluation and calibration of defects due to the presence of lateral thermal diffusion, resulting in poor defect detection accuracy.

SUMMARY

In view of the deficiencies in the prior art, this application provides a non-destructive testing system and device for photovoltaic cells, which can detect the surface and internal defects of the photovoltaic cells without being in contact with the photovoltaic cells.

Technical solutions of this application are described as follows.

In a first aspect, this application provides a non-destructive testing system for photovoltaic cells, including:
a non-contact electromagnetic induction device;
a short-wave infrared (SWIR) camera or/and a visible-light camera;
a thermal imaging device; and
an image processing device;
wherein the non-contact electromagnetic induction device is configured to generate an external electric field acting on a to-be-tested photovoltaic cell without being in contact with the to-be-tested photovoltaic cell; and a direction of the external electric field is parallel to a direction of an internal electric field of the to-be-tested photovoltaic cell;
the SWIR camera or/and the visible light camera is/are configured to obtain an optical radiation distribution map within the to-be-tested photovoltaic cell;
the thermal imaging device is configured to obtain a thermal radiation distribution map within the to-be-tested photovoltaic cell; and
the image processing device is configured to store and process the optical radiation distribution map and the thermal radiation distribution map.

In the photovoltaic cells, the N region has a high electron concentration, and the P region has a high hole concentration, so the electrons will diffuse from the N region to the P region, and the holes will diffuse from the P region to the N region. At this time, the positively charged nuclei are left in the N region, on the contrary, the negatively charged nuclei are left in the P region, such that an internal electric field from the N region towards the P region is formed. The non-contact electromagnetic induction device is configured to generate an external electric field acting on the to-be-tested photovoltaic cell without being in contact with the to-be-tested photovoltaic cell. The direction of the external electric field is parallel to that of the internal electric field of the to-be-tested photovoltaic cell. If the external electric field is opposite to the internal electric field in direction, the total electric field inside the photovoltaic cell will be weakened, and the diffusion of the minority carriers will be enhanced. When the direction of the external electric field is the same as that of the internal electric field, the total electric field inside the photovoltaic cell will be enhanced, and the drift motion of the minority carriers will be enhanced. Therefore, regardless of the application of forward bias voltage or reverse bias voltage, the equilibrium state inside the photovoltaic cell will be broken, and the non-equilibrium minority carriers will continuously undergo recombination when meeting the majority carriers in the original region, and then produce optical radiation. At a constant temperature, the intensity of the optical radiation is directly proportional to the concentration and diffusion length of the minority carriers. At the same time, when there is an external electric field inside the photovoltaic battery, the concentration of excess minority carriers at the P-N junction will increase, and the luminescent intensity of the battery is also enhanced. Due to the lower diffusion length of the minority carriers in the defect area, a weaker light is emitted, and a darker image is created. At the same time, the external electric field will generate thermal radiation inside the photovoltaic cell due to the Joule effect. When there are defects on the surface or inside of the to-be-tested photovoltaic cell, the defects will cause disturbance to the optical and thermal flow fields, resulting in abnormal light and heat distribution. Consequently, it is feasible to enable the defect detection by obtaining the optical radiation distribution map and thermal radiation distribution map of the to-be-tested photovoltaic cell. The minority carrier diffusion length is characterized by the average distance that the minority carriers can travel while experiencing diffusion and recombination.

In an embodiment, the non-contact electromagnetic induction device comprises two induction coils; the two induction coils are respectively provided on both sides of the to-be-tested photovoltaic cell; and the two induction coils are parallel to the direction of the internal electric field of the to-be-tested photovoltaic cell. By controlling the two induction coils, an external electric field parallel to the internal electric field of the to-be-tested photovoltaic cell can be generated.

In an embodiment, the two induction coils are the same in current magnitude and direction. In this way, when the to-be-tested photovoltaic cell is placed in the external electric field generated by the two induction coils, the total electric field inside the to-be-tested photovoltaic cell will be relatively uniformly distributed, maximally avoiding the influence of lateral thermal diffusion on the detection result.

In an embodiment, an induction current in each of the two induction coils are adjustable in magnitude and direction. By adjusting the magnitude of the induction current in the induction coils, the magnetic field strength generated by the induction coil can be adjusted, thereby adjusting the intensity of the external electric field pointing from the P region to the N region in the to-be-tested photovoltaic cell.

In an embodiment, the non-destructive testing system further includes an image display device electrically connected with the image processing device to display an image stored and processed by the image processing device. The non-destructive testing results can be visually presented through the image display device.

In an embodiment, the non-destructive testing system further includes a movable guide rail, wherein the non-contact electromagnetic induction device, the SWIR camera or/and the visible-light camera, and the thermal imaging device are mounted on the movable guide rail; and relative positions between the non-contact electromagnetic induction device, the SWIR camera or/and the visible light camera, and the thermal imaging device remain unchanged during movement of the movable guide rail.

This application further provides a non-destructive testing device for photovoltaic cells, including the above non-destructive testing system.

Compared to the prior art, this application has the following beneficial effects.

(1) The non-contact electromagnetic induction device, the thermal imaging device, the SWIR camera or/and the visible light camera, the image processing device and the image display device do not need to be in contact with the to-be-tested photovoltaic cell in the testing process (namely, non-contact detection), avoiding causing damage to the to-be-tested photovoltaic cell.

(2) The external electric field generated by the non-contact electromagnetic induction device can avoid the influence of lateral thermal diffusion on defect detection, improving the detection accuracy and efficiency.

(3) By means of the movable guide rail, the dynamic imaging and mobile detection are enabled, and the dynamic optical radiation distribution map and thermal radiation distribution map can be acquired. The deep learning can be incorporated into the image processing to further improve the detection efficiency.

In the figures: 1—control device; 2—computer device; 3—excitation device; 4—short-wave infrared (SWIR) camera; 5—thermal imager; 6—induction coil; 7—to-be-tested photovoltaic cell; and 701—internal defect.

DETAILED DESCRIPTION OF EMBODIMENTS

Figure 1:
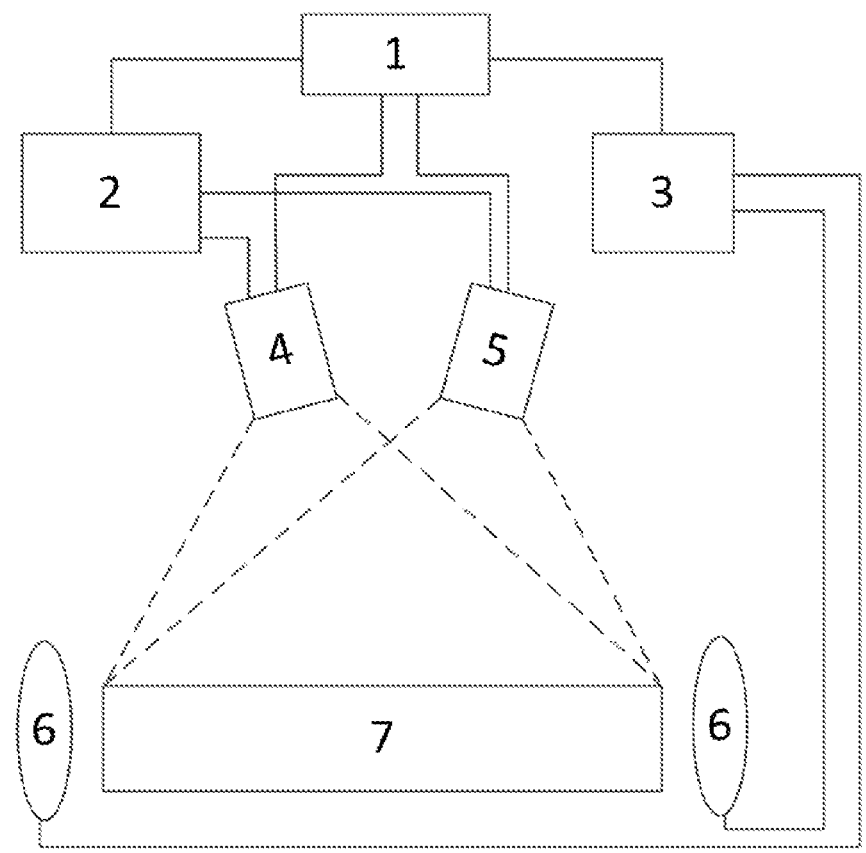
FIG. 1 schematically shows a structure of non-destructive testing equipment for photovoltaic cells according to one embodiment of the present disclosure.

As shown in FIG. 1, the non-destructive testing equipment for photovoltaic cells includes a non-destructive testing system, an excitation device 3 and a control device 1. The non-destructive testing system includes a non-contact electromagnetic induction device, a short-wave infrared (SWIR) camera 4, a thermal imaging device, an image processing device, an image display device and a movable guide rail.

In an embodiment, the non-contact electromagnetic induction device is a Helmholtz coil. Specifically, the Helmholtz coil includes two circular induction coils 6 which are arranged parallel to each other and coaxially. The two induction coils 6 are the same in the current magnitude and direction. The thermal imaging device includes a thermal imager 5. The image processing device and the image display device are integrated in a computer device 2.

Figure 2:
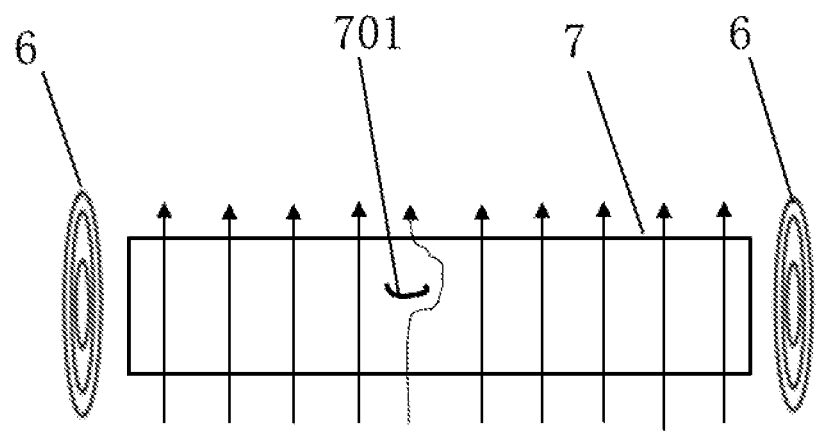
FIG. 2 schematically shows a position relationship between induction coils and a to-be-tested photovoltaic cell according to one embodiment of the present disclosure.

The excitation device 3 is electrically connected to the two induction coils 6 through wires to provide an adjustable working current for the two induction coils 6. As shown in FIG. 2, the two induction coils 6 are respectively arranged on both sides of the to-be-tested photovoltaic cell 7, and the two induction coils 6 are parallel to the direction of an internal electric field of the to-be-tested photovoltaic cell 7.

The computer device 2, the excitation device 3, the SWIR camera 4, and the thermal imager 5 are all electrically connected to the control device 1, and the control device 1 is used to control the operation state of the computer device 2, the excitation device 3, the SWIR camera 4, and the thermal imager 5.

The SWIR camera 4 and the thermal imager 5 are disposed directly above the to-be-tested photovoltaic cell 7. Through the SWIR camera 4, the optical radiation distribution map of the to-be-tested photovoltaic cell 7 can be obtained, and the thermal radiation distribution map of the to-be-tested photovoltaic cell 7 can be obtained through the thermal imager 5.

The SWIR camera 4 and the thermal imager 5 are electrically connected with the computer device 2 to process and display the images obtained by the SWIR infrared camera 4 and the thermal imager 5.

The two induction coils 6, the SWIR camera 4, and the thermal imager 5 are mounted on the movable guide rail (not shown in the figures). During the movement of the movable guide rail, the relative positions between the two induction coils 6, the SWIR camera 4, and the thermal imager 5 remain unchanged.

In an embodiment, the non-destructive testing equipment can simultaneously realize static detection and dynamic detection. In the static detection, the to-be-tested photovoltaic cell 7 and the movable guide rail are both kept static. There are two dynamic detection modes: (1) moving the to-be-tested photovoltaic cell 7 and keeping the movable guide rail static; and (2) keeping the to-be-tested photovoltaic cell 7 static and moving the movable guide rail.

As shown in FIG. 2, during the detection process, the to-be-tested photovoltaic cell 7 is placed between the two induction coils 6, and the two induction coils 6 are parallel to the internal electric field direction of the to-be-tested photovoltaic cell 7. The computer device 2, the excitation device 3, the SWIR camera 4, and the thermal imager 5 are started by the control device 1. At this time, the two induction coils 6 generates a magnetic field due to the presence of current therein, and also generate a magnetic field therebetween. Further, in the area where the to-be-tested photovoltaic cell 7 is placed, an external electric field whose direction is parallel to the direction of the internal electric field of the to-be-tested photovoltaic cell 7 is generated (the direction of the external electric field is indicated by the arrow in FIG. 2). At this time, optical radiation and thermal radiation are produced inside the to-be-tested photovoltaic cell 7, and the internal defect 701 of the to-be-tested photovoltaic cell 7 will cause disturbance to the optical and thermal flow fields, resulting in abnormal light and heat distribution at the defect 701. Whether there are defects in the to-be-tested photovoltaic cell 7, and the size and type of defects can be visually determined based on the optical radiation distribution map obtained by the SWIR camera 4 and the thermal radiation distribution map obtained by the thermal imager 5, after processed and displayed by the computer device 2.

By adjusting the excitation device 3, the working current of the two induction coils 6 may be adjusted to adjust the intensity of the external electric field.

Three-dimensional data reconstruction and deep learning can be integrated into the non-destructive testing equipment provided herein to perform dynamic image processing, improving the defect identification ability during dynamic detection.

What is claimed is:

1. A non-destructive testing system for photovoltaic cells, comprising:
   a non-contact electromagnetic induction device;
   a short-wave infrared (SWIR) camera or/and a visible-light camera;
   a thermal imaging device; and
   an image processing device;
   wherein the non-contact electromagnetic induction device is configured to generate an external electric field acting on a to-be-tested photovoltaic cell without being in contact with the to-be-tested photovoltaic cell; and a direction of the external electric field is parallel to a direction of an internal electric field of the to-be-tested photovoltaic cell;
   the SWIR camera or/and the visible light camera is/are configured to obtain an optical radiation distribution map within the to-be-tested photovoltaic cell;
   the thermal imaging device is configured to obtain a thermal radiation distribution map within the to-be-tested photovoltaic cell;
   the image processing device is configured to store and process the optical radiation distribution map and the thermal radiation distribution map;
   the non-contact electromagnetic induction device comprises two induction coils; the two induction coils are respectively provided on both sides of the to-be-tested photovoltaic cell; and the two induction coils are parallel to the direction of the internal electric field of the to-be-tested photovoltaic cell; and
   the two induction coils are the same in current magnitude and direction.

2. The non-destructive testing system of claim 1, wherein an induction current in each of the two induction coils are adjustable in magnitude and direction.

3. The non-destructive testing system of claim 2, further comprising:
   an image display device;
   wherein the image display device is electrically connected with the image processing device to display an image processed and stored by the image processing device.

4. A non-destructive testing equipment for photovoltaic cells, comprising:
   the non-destructive testing system of claim 1.

5. A non-destructive testing system for photovoltaic cells, comprising:
   a non-contact electromagnetic induction device;
   a short-wave infrared (SWIR) camera or/and a visible-light camera;
   a thermal imaging device; and
   an image processing device;
   wherein the non-contact electromagnetic induction device is configured to generate an external electric field acting on a to-be-tested photovoltaic cell without being in contact with the to-be-tested photovoltaic cell; and a direction of the external electric field is parallel to a direction of an internal electric field of the to-be-tested photovoltaic cell;
   the SWIR camera or/and the visible light camera is/are configured to obtain an optical radiation distribution map within the to-be-tested photovoltaic cell;
   the thermal imaging device is configured to obtain a thermal radiation distribution map within the to-be-tested photovoltaic cell;
   the image processing device is configured to store and process the optical radiation distribution map and the thermal radiation distribution map;
   the non-destructive testing system further comprising:
   a movable guide rail;
   wherein the non-contact electromagnetic induction device, the SWIR camera or/and the visible-light camera, and the thermal imaging device are mounted on the movable guide rail; and relative positions between the non-contact electromagnetic induction device, the SWIR camera or/and the visible-light camera, and the thermal imaging device remain unchanged during movement of the movable guide rail.

* * * * *